US009051508B2

(12) United States Patent
Livanec et al.

(10) Patent No.: US 9,051,508 B2
(45) Date of Patent: Jun. 9, 2015

(54) METHODS OF PREVENTING EMULSIFICATION OF CRUDE OIL IN WELL BORE TREATMENT FLUIDS

(71) Applicant: Halliburton Energy Services, Inc., Houston, TX (US)

(72) Inventors: Philip W. Livanec, Deer Park, TX (US); Gregory P. Perez, Pearland, TX (US); Jay P. Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 350 days.

(21) Appl. No.: 13/649,156

(22) Filed: Oct. 11, 2012

(65) Prior Publication Data

US 2013/0032409 A1    Feb. 7, 2013

Related U.S. Application Data

(60) Continuation-in-part of application No. 12/630,502, filed on Dec. 3, 2009, now Pat. No. 8,603,951, which is a division of application No. 11/873,257, filed on Oct. 16, 2007, now Pat. No. 7,665,523.

(51) Int. Cl.
| | |
|---|---|
| *C09K 8/12* | (2006.01) |
| *C09K 8/52* | (2006.01) |
| *C09K 8/528* | (2006.01) |
| *C09K 8/524* | (2006.01) |

(52) U.S. Cl.
CPC .. *C09K 8/524* (2013.01); *C09K 8/12* (2013.01)

(58) Field of Classification Search
CPC .............. C09K 8/04; C09K 8/12; C09K 8/58; C09K 8/588; Y10S 507/903; Y10S 507/93; Y10S 507/927; Y10S 507/929; Y10S 507/935; Y10S 507/936
USPC ........... 507/90, 100, 119, 224, 929, 930, 931, 507/927
See application file for complete search history.

(56) References Cited

U.S. PATENT DOCUMENTS

| | | | |
|---|---|---|---|
| 2,650,905 | A | 3/1950 | Fordyce |
| 2,718,497 | A | 9/1955 | Oldham |
| 3,960,214 | A | 6/1976 | Striegler et al. |
| 4,103,074 | A | 7/1978 | Hertel et al. |
| 4,217,956 | A * | 8/1980 | Goss et al. ............... 166/272.3 |
| 4,405,015 | A * | 9/1983 | McCoy et al. ............ 166/267 |
| 4,797,450 | A | 1/1989 | Dehm et al. |
| 4,812,327 | A | 3/1989 | Hanazawa et al. |
| 4,874,043 | A * | 10/1989 | Joseph et al. ............. 166/272.3 |
| H837 | H | 11/1990 | Peiffer et al. |
| 5,032,295 | A | 7/1991 | Matz et al. |
| 5,658,577 | A | 8/1997 | Fowler et al. |
| 5,866,517 | A | 2/1999 | Carpenter et al. |
| 6,104,224 | A | 8/2000 | Koshikawa |
| 6,564,869 | B2 | 5/2003 | McKenzie et al. |
| 6,632,779 | B1 | 10/2003 | Vollmer et al. |
| 6,715,568 | B1 | 4/2004 | Bailey |
| 6,825,152 | B2 | 11/2004 | Green |
| 7,081,438 | B2 | 7/2006 | Horton |
| 7,278,485 | B2 | 10/2007 | Kirsner et al. |
| 7,332,458 | B2 | 2/2008 | Baltoiu et al. |
| 7,665,523 | B2 | 2/2010 | Perez |
| 8,603,951 | B2 | 12/2013 | Perez |
| 2004/0129459 | A1 | 7/2004 | Guichard et al. |
| 2004/0204324 | A1 | 10/2004 | Baltoiu et al. |
| 2005/0037927 | A1 | 2/2005 | Horton |
| 2006/0003899 | A1 | 1/2006 | Levey et al. |
| 2006/0144594 | A1 | 7/2006 | Perez |
| 2006/0148656 | A1 | 7/2006 | Perez |
| 2007/0114036 | A1 | 5/2007 | Perez |
| 2008/0214413 | A1 | 9/2008 | Ewanek et al. |
| 2009/0011960 | A1 | 1/2009 | Wu |
| 2010/0081584 | A1 | 4/2010 | Perez |
| 2010/0298173 | A1 | 11/2010 | Smith et al. |
| 2011/0000400 | A1 | 1/2011 | Roddy |
| 2012/0132423 | A1 | 5/2012 | Livanec et al. |

FOREIGN PATENT DOCUMENTS

| | | |
|---|---|---|
| CA | 2451585 | 6/2004 |
| CA | 2478622 | 5/2005 |
| CA | 2481543 | 3/2006 |
| EP | 0626397 | 11/1994 |
| EP | 0837122 A2 | 4/1998 |
| EP | 2071405 A1 | 6/2009 |
| WO | 2004050791 | 6/2004 |
| WO | 2004060790 | 7/2004 |
| WO | 2007041841 | 4/2007 |
| WO | 2011092491 | 8/2011 |

OTHER PUBLICATIONS

Office Action from U.S. Appl. No. 13/555,624 dated Feb. 26, 2013.
Office Action from U.S. Appl. No. 12/630,502 dated Feb. 27, 2013.
USPTO Office Action for U.S. Appl. No. 13/555,624 dated Apr. 23, 2014.
International Search Report and Written Opinion of the International Searching Authority for PCT/US2013/025252 dated Jun. 13, 2013.
Office Action for U.S. Appl. No. 12/630,502 dated Jun. 27, 2013.
Advisory Action from USPTO for U.S. Appl. No. 12/630,502 dated Sep. 9, 2013.

(Continued)

*Primary Examiner* — Aiqun Li
(74) *Attorney, Agent, or Firm* — Holly Soehnge; Tumey L.L.P.

(57) ABSTRACT

Of the many compositions and methods provided herein, one method includes a method of preventing emulsification of crude oil into an aqueous-based treatment fluid, comprising: contacting crude oil in a well bore with the aqueous-based treatment fluid comprising a styrene-acrylate copolymer, wherein the crude oil has an API gravity of about 10 or greater; and allowing the styrene-acrylate copolymer to interact with the crude oil in the well bore.

20 Claims, No Drawings

(56) References Cited

OTHER PUBLICATIONS

Thomson Scientific, London, GB; 1985-043467, XP002512517.
Thomson Scientific, London, GB, 1989-229547, XP002512518.
International Search Report and Written Opinion for PCT/GB2008/003405, dated Feb. 5, 2009.
Warren, et al., "Development and Field Results of a Unique Drilling Fluid Designed for Heavy Oil Sands Drilling," Society of Petroleum Engineers, SPE 92462, 1-9, Feb. 23-25, 2005.
Freeman, et al., "Novel Drilling Fluid Eliminates Tar Problems Associated With Drilling SAGD Wells," Society of Petroleum Engineers, SPE 90986, 1-5, Sep. 26-29, 2004.
USPTO Office Action for U.S. Appl. No. 11/873,257 dated May 21, 2009.
USPTO Notice of Allowability for U.S. Appl. No. 11/873,257 dated Nov. 17, 2009.
USPTO Office Action for U.S. Appl. No. 12/630,502 dated May 11, 2011.
USPTO Office Action for U.S. Appl. No. 12/630,502 dated Sep. 23, 2011.
Kostansek, "Emulsions" in Kirk-Othmer Encyclopedia of Chemical Technology 2003, vol. 10, pp. 113-133.
MSDS datasheet of Plioway ULTRA 200 from Eliokem.
MSDS datasheet of CIBA Alcomer 1771, 2005.
CETCO technical datasheet of Barite, 2011.
USPTO Office Action for U.S. Appl. No. 12/630,502 dated May 17, 2012.
USPTO Office Action for U.S. Appl. No. 13/368,639 dated May 18, 2012.
USPTO Office Action for U.S. Appl. No. 13/368,639 dated Apr. 5, 2012.
USPTO Office Action for U.S. Appl. No. 13/555,624 dated Oct. 19, 2012.
HES Product Data Sheet "EZ-MUD® " dated May 2008.
HES Product Data Sheet "Barazan® D Plus" dated May 16, 2012.
HES Product Data Sheet "Filter-Chek™" dated Mar. 26, 2010.
HES Product Data Sheet "PAC™-R" dated Mar. 26, 2010.
HES Product Data Sheet "Baracor® 700" dated Mar. 24, 2010.
HES Product Data Sheet "Dextrid® LT" dated Mar. 26, 2010.
HES Product Data Sheet "Baracarb®" dated Mar. 24, 2010.
USPTO Office Action for U.S. Appl. No. 13/368,639 dated Jan. 15, 2014.
SIGMA-ALDRICH polyacrylic acid specification data sheet, downloaded from SIGMA-ALDRICH web site on Jan. 3, 2014.
International Search Report and Written Opinion for Application No. PCT/US2013/064373 dated Dec. 23, 2013.
USPTO Notice of Allowance for U.S Appl. No. 13/555,624 dated Sep. 18, 2014.

* cited by examiner

METHODS OF PREVENTING EMULSIFICATION OF CRUDE OIL IN WELL BORE TREATMENT FLUIDS

CROSS-REFERENCE TO RELATED APPLICATIONS

The present application is a continuation-in-part of U.S. patent application Ser. No. 12/630,502, entitled "Compositions and Methods for Treatment of Well Bore Tar," filed on Dec. 3, 2009, which is a divisional of U.S. patent application Ser. No. 11/873,257, entitled "Compositions and Methods for Treatment of Well Bore Tar," filed on Oct. 16, 2007, issued as U.S. Pat. No. 7,665,523, the entire disclosures of which are incorporated herein by reference.

BACKGROUND

The present invention relates to methods and compositions for use in subterranean operations. More particularly, the present invention relates to styrene-acrylate copolymers used to treat tar and/or crude oil resident in a well bore and associated methods of use.

Many subterranean operations involve the drilling of a well bore from the surface through rock and/or soil to penetrate a subterranean formation containing fluids that are desirable for production. In the course of drilling operations and other subterranean operations, the drillstring and/or other equipment may come into contact with zones of rock and/or soil containing tar and/or crude oil, such as heavy and light (liquid) hydrocarbons, asphalt, and bitumens; in man such operations, it may be desirable to drill the well bore through these zones containing tar and/or liquid crude. However, problems may be encountered when these zones are encountered. For example, crude oil present in the zone(s) may enter the well bore and emulsify or otherwise disperse into the drilling fluid. This is problematic in that contamination of the drilling fluid with the crude oil can undesirably impact the fluid properties, as welt as present complications with fluid disposal. If the drilling fluid is contaminated, extra precautions may need to be used for removal of the crude oil from the drilling fluid such that the surrounding environment is not polluted. Various techniques have been used to remove crude oil from drilling fluid to prevent oil pollution. In one technique, demulsifiers can be used to break the oil-in-water emulsion. In another technique, heat can be used to break the emulsion. However, both of these techniques can be difficult to implement in the field, as emulsification of crude oil into the drilling fluid can often form very strong emulsions that are hard to break.

In addition to problems drilling through liquid-crude-containing zones, problems may also be encountered when a zone or zones containing tar are encountered. Tar is a relatively tacky substance that may readily adhere to any surface that it contacts, including the surfaces of the well bore and/or any equipment utilized during the drilling operation. Tar also may dissolve into many synthetic treatment fluids used in the course of drilling operations, increasing the tacky and adhesive properties of the tar. If a sufficient amount of tar adheres to surfaces in the well bore or drilling equipment, it may, among other problems, prevent the drillstring from rotating, prevent fluid circulation, or otherwise impede the effectiveness of a drilling operation. In some cases, it may become necessary to remove and/or disassemble the drillstring in order to remove accretions of tar, a process which may create numerous cost and safety concerns. The accretion of tar on drilling equipment and/or in the well bore also can impede any subsequent operations downhole, including cementing, acidizing, fracturing, sand control, and remedial treatments. In addition, soft, tacky tar that manages to reach the surface may foul surface equipment, including solids screening equipment.

Existing methods of managing these problems that result from well bore tar incursion may be problematic. Some of these methods involve affecting an increase in hydrostatic pressure in the well bore so as to force the tar out of the well bore to the surface. However, this increased hydrostatic pressure may damage the well bore and/or a portion of the subterranean formation. Other conventional methods utilize treatment fluids that comprise dispersants, surfactants, and/or solubilizers, which allow the tar particles to dissolve in or homogenize with the treatment fluids. However, the tar particles may not be readily separated out of the fluid once they have dissolved into or homogenized with the fluid. The presence of the tar particles in the treatment fluid may alter its rheological properties and/or suspension capacity, which may limit its use in subsequent operations. Moreover, the addition of these dispersants, surfactants, and solubilizers may increase the complexity and cost of the drilling operation.

SUMMARY

The present invention relates to methods and compositions for use in subterranean operations. More particularly, the present invention relates to styrene-acrylate copolymers used to treat tar and/or crude oil resident in a well bore and associated methods of use.

In one embodiment, the present invention provides a method of method of preventing emulsification of crude oil into an aqueous-based treatment fluid, comprising: contacting crude oil in a well bore with the aqueous-based treatment fluid comprising a styrene-acrylate copolymer, wherein the crude oil has an API gravity of about 10 or greater and allowing the styrene-acrylate copolymer to interact with the crude oil in the well bore.

In another embodiment, the present invention provides a method of treating crude oil, comprising: using a drill bit to enlarge a well bore in a subterranean formation, wherein crude oil from the subterranean formation enters the well bore, wherein the crude oil has an API gravity of about 10 or greater; and circulating an aqueous-based dulling fluid past the drill bit, the aqueous-based drilling fluid comprising an aqueous fluid and a styrene-acrylate copolymer, wherein the styrene-acrylate copolymer interacts with the crude oil in the well bore such that the crude oil forms agglomerates in the aqueous-based drilling fluid.

In another embodiment, the present invention provides a method of treating crude oil, comprising: using a drill bit to enlarge a well bore in a subterranean formation, wherein crude oil from the subterranean formation enters the well bore, wherein the crude oil has an API gravity of about 10 or greater; circulating an aqueous-based drilling fluid past the drill bit, wherein the aqueous-based drilling fluid comprises an aqueous fluid and a crosslinked styrene-methacrylate copolymer emulsion in an amount sufficient to prevent emulsification of the crude oil into the aqueous-based drilling fluid; and screening the aqueous-based drilling fluid such that the crude oil is removed from the aqueous-based drilling fluid.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for use in subterranean operations. More particularly, the present invention relates to styrene-acrylate copolymers used to treat tar and/or crude oil resident in a well bore and associated methods of use.

Example Treatment Fluids

The treatment fluids of the present invention generally comprise an aqueous fluid and a styrene-acrylate copolymer. As used herein, the term "treatment fluid" refers to any fluid that may be used in a subterranean application in conjunction with a desired function and/or for a desired purpose. The term "treatment fluid" does not imply any particular action by the fluid or any compound thereof. Treatment fluids may be used, for example, to drill, complete, work over, fracture, repair, or in any way prepare a well bore for recovery of materials residing in a subterranean formation penetrated by the well bore. Examples of treatment fluids include, but are not limited to, cement compositions, drilling fluids, spacer fluids, and spotting fluids.

Generally, any styrene-acrylate copolymer that can be emulsified in an aqueous fluid may be used. The polymeric material may be ionic or nonionic in nature. In certain embodiments, the styrene-acrylate copolymers may interact with the tar resident in a well bore such that the properties of the tar are altered. In certain embodiments, the polymer may bind or coat the tar such that the tar becomes less sticky. In certain embodiments, the polymer may bind or coat the crude oil such that the crude does not emulsify into the treatment fluid. Thus, the polymer (or polymers when more than one styrene-acrylate copolymer is used) should be added to the well bore in a quantity sufficient to treat the tar and/or crude oil therein, in accordance with embodiments of the present invention.

In certain embodiments, the concentration of the styrene-acrylate copolymer in the treatment fluid may be at least about 1% by volume of the fluid, and up to an amount such that the styrene-acrylate copolymers will precipitate out of the fluid. In certain embodiments, the concentration of styrene-acrylate copolymer in the treatment fluid may be in the range of from about 1% to about 70% by volume of the fluid. In certain embodiments, the concentration of styrene-acrylate copolymer in the treatment fluid may be in the range for from about 1% to about 10% by volume of the fluid. In certain embodiments, the styrene-acrylate copolymer may be added to a treatment fluid, or introduced directly into the well bore, as latex-type emulsions or as dispersed particles. For example, styrene-acrylate copolymer emulsions may be used. In some embodiments, the latex-type emulsions may be crosslinked. One of ordinary skill in the art, with the benefit of this disclosure, will be able to determine the appropriate concentration of the styrene-acrylate copolymer in the fluid for a particular application.

Examples of styrene-acrylate copolymers that may be suitable for use in the treatment fluids of the present invention may include, but are not limited to, copolymers derived from styrene and acrylate. In some embodiments, the styrene-acrylate copolymers may include styrene-acrylate copolymers and mixed copolymers, which include at least one of styrene, a substituted styrene, and any derivative thereof; and at least one of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, or any derivative thereof. An example of a suitable styrene-acrylate copolymer comprises a styrene-methacrylate copolymer. Combinations of suitable styrene-acrylate copolymers may also be suitable, in certain embodiments.

The aqueous fluid utilized in the treatment fluids of the present invention may be fresh water, distilled water, or salt water (e.g., water containing one or more salts dissolved therein). For example, the styrene-acryalte copolymer or polymer emulsion may be dispersed in the aqueous fluid to form the treatment fluid. In certain embodiments, the treatment fluid may be an aqueous-based fluid. Generally, the water can be from any source, provided that it does not contain compounds that undesirably affect other components of the treatment fluid.

Optionally, some embodiments may include a surfactant to aid the emulsification and/or suspension of the styrene-acrylate copolymers. Generally, any surfactant that will emulsify and/or suspend the styrene-acrylate copolymers may be used in the fluids of the present invention. In certain embodiments, it may be desirable to select a surfactant that will not emulsify the tar sought to be treated. In certain embodiments, the surfactants may be present in an amount sufficient to emulsify and/or suspend the styrene-acrylate copolymers. This amount may depend on, among other things, the type of surfactant used and the amount of polymer to be emulsified and/or suspended. A person of ordinary skill in the art will recognize, with the benefit of this disclosure, the type and amount of surfactant that should be added for particular application.

In certain embodiments, the treatment fluids of the present invention may also comprise additional components to enhance, among other things, the performance of the styrene-acrylate copolymers in specific applications. For example, some embodiments may comprise a viscosifier, among other purposes, to aid in suspending the styrene-acrylate copolymers in a treatment fluid, such as a drilling fluid. Suitable viscosifying agents may include, but are not limited to, colloidal agents (e.g., clays such as bentonite, polymers, guar gum), emulsion-forming agents, diatomaceous earth, biopolymers, synthetic polymers, chitosans, starches, gelatins, or mixtures thereof.

The treatment fluids of the present invention optionally may comprise additional additives to enhance the performance of the fluid. The treatment fluids of the present invention may comprise any such additional additives that do not undersirable interact with the styrene-acrylate copolymer or other components of the fluid. Generally, additional additives should not emulsify or dissolve the tar and/or crude oil to be treated. The treatment fluids used in methods of the present invention optionally may comprise any number of additional additives, including, but not limited to, salts, surfactants, additional fluid-loss-control additives, gas, nitrogen, carbon dioxide, surface-modifying agents, tackifying agents, foamers, additional corrosion inhibitors, scale inhibitors, catalysts, clay-control agents, biocides, friction reducers, antifoam agents, bridging agents, dispersans, flocculants, $H_2S$ scavengers, $CO_2$ scavengers, oxygen scavengers, lubricants, viscosifiers, breakers, weighting agents (e.g., barite), relative-permeability modifiers, resins, particulate materials (e.g., proppant particulates), wetting agents, coating-enhancement agents, and the like. Weighting agents may be used, for example, in a drilling fluid to provide a density sufficient to, for example, control formation pressures. In certain embodiments, the drilling fluid may have a density in the range of form about 7.5 pounds per gallon ("lb/gal") to about 18 lb/gal, and alternatively form about 12 lb/gal to about 18 lb/gal. One or ordinary skill in the art, with the benefit of this disclosure, will be able to determine which additional additives are appropriate for a particular application.

Example Tar-Treatment Methods

In some embodiment, the treatment fluids may be used for the treatment of tar resident in a well bore. One of the many advantages of the present invention, many of which are not discussed or alluded to herein, is that tar treated by the compositions and methods disclosed herein may be substantially less tacky and/or less able to adhere to a surface. As a result, tar treated in this manner may be susceptible to screen separation from treatment fluids, drill cuttings, tar sands, and the like.

Generally, the methods of the present invention comprise allowing a fluid comprising a styrene-acrylate copolymer to interact with tar resident in a well bore, which may, among other things, reducing the adhesiveness of the tar to facilitate removal of the tar from a well bore or other surface. When the styrene-acrylate copolymer interacts with tar, the styrene may coat or encapsulate the tar such that the tar is less tacky. In applications where it is desirable to drill through tar encountered in the course of drilling a well bore, drilling through tar altered in this way may yield tar-cuttings that can be removed more effectively from the well bore. Additionally, tar that is drilled-through may be less likely to flow into the well bore or the subterranean formation as the plastic properties of the tar may be altered. Similarly, in applications where the styrene-acrylate copolymer is added to a drilling fluid, the treated tar that forms about the surface of the well bore may act to stabilize the well bore. In addition, tar treated with the compositions and methods of the present invention may be separated from a treatment fluid by passing the fluid through a screen or similar separation apparatus.

In one embodiment, the present invention provides a method comprising contacting tar resident in a well bore with a treatment fluid comprising an aqueous fluid and a styrene acrylate copolymer. In such embodiments, the styrene-acrylate copolymer may be provided in various forms, including, but not limited to, an emulsion, a suspension, a powder, and any combination thereof. In certain embodiments, the treatment fluid may be an aqueous-based fluid. Introducing the styrene-acrylate copolymer to the vicinity of a desired portion of the well bore may be accomplished by a variety of methods known by a person of ordinary skill in the art with the benefit of this disclosure. One example of such a method comprises pumping water into the well bore, wherein the styrene-acrylate copolymer is carried into the well bore on the leading edge of the water (e.g., a plug). In other embodiments of the present invention, the polymer may be pumped into the well bore while suspended in a treatment fluid (e.g., a drilling fluid).

In certain embodiments, the styrene-acrylate copolymer may be provided as a "spot treatment" or "pill," wherein the polymer is pumped into the well bore to interact with tar in a specific portion of the well bore. In certain embodiments of this type, the styrene-acrylate copolymer may be allowed to interact with the tar resident in the well bore for at least a time sufficient to at least partially reduce the adhesiveness of the tar. In some circumstances, this may be more than about one hour. In others, more time will be required to at least partially reduce the adhesiveness of the tar, depending upon, among other factors, the temperature inside the well bore and the amount of tar in the portion of the well bore being treated. One of ordinary skill in the art, with the benefit of this disclosure, will be able to determine the appropriate amount of time to allow the styrene-acrylate copolymer to interact with the tar. In certain embodiments, after the styrene-acrylate copolymer has been allowed to interact with the tar, the tar then may be removed from the well bore by any means practicable for the given application.

In some applications, embodiments of the present invention may be used in conjunction with non-aqueous treatment fluids. Embodiments such as a spot treatment or pill may be especially suited for use in conjunction with non-aqueous-based treatment fluids. Where the treatment fluid is non-aqueous based, the treatment fluid may comprise any number of organic liquids. Examples of suitable organic liquids include, but are not limited to, mineral oils, synthetic oils, esters, paraffin oils, diesel oil, and the like.

In another embodiment, the present invention provides a method comprising contacting tar resident in a well bore with a treatment fluid comprising an aqueous fluid and a styrene-acrylate copolymer into a well bore and allowing the styrene-acrylate copolymer to interact with tar resident in the well bore to at least partially reduce the tendency of the tar to adhere to a surface. In certain embodiments of this type, the styrene-acrylate copolymer may be allowed to interact with the tar as long as the treatment fluid is present in the well bore. One of ordinary skill in the art, with the benefit of this disclosure, will be able to determine the appropriate amount of time to allow the styrene-acrylate copolymer to interact with the tar so as to at least partially reduce the adhesiveness of the tar. In certain embodiments, after the styrene-acrylate copolymer has been allowed to interact with the tar, the tar then may be removed from the well bore by any means practicable for the given application.

In another embodiment, the present invention provides a method comprising: placing a treatment fluid comprising an aqueous fluid and a styrene-acrylate copolymer into a well bore; and monitoring the amount of the styrene-acrylate copolymer present in the treatment fluid. For example, once a unit of styrene-acrylate copolymer in a treatment fluid is allowed to interact with a unit of tar in a well bore, that unit of styrene-acrylate copolymer may be depleted from the treatment fluid and this unable to interact with additional tar. For this reason, it may be desirable to monitor the concentration of the styrene-acrylate copolymer in the treatment fluid to determine if more should be added. In some embodiments, the styrene-acrylate copolymer may be introduced into the treatment fluid before the treatment fluid is introduced into the well bore, for example, a batch-mixing process. In some embodiments, it may be desirable to continue to add the styrene-acrylate copolymer to the treatment fluid (e.g., "on-the-fly" mixing) according to the monitored concentration of the styrene-acrylate copolymer in the treatment fluid. In some embodiments, the concentration of styrene-acrylate copolymer in the treatment fluid may be monitored by direct measurement. In some embodiments, the concentration of styrene-acrylate copolymer in the treatment fluid may be monitored indirectly by measuring the depletion of the styrene-acrylate copolymer from the treatment fluid. The concentration of the styrene-acrylate copolymer in the treatment fluid may be monitored, for example, by analytical polymer spectroscopy, chromatography, gravimetry, and quantitative precipitation.

Another embodiment provides a method of treating tar sands to separate the tar from the sand comprising: contacting the tar sand with a treatment fluid comprising an aqueous fluid and a styrene-acrylate copolymer, the tar sand comprising tar and sand; and allowing the styrene-acrylate copolymer to interact with the tar to at least partially separate the tar from the sand. The term "tar sand" does not require or imply that any specific amount of tar be present.

Another embodiment provides a methods of drilling a well bore comprising: using a drill bit to enlarge a well bore; and circulating a drilling fluid past the drill but to remove cuttings there from, the drilling fluid comprising an aqueous fluid and a styrene-acrylate copolymer. In certain embodiments, tar may be present within the well bore, and the styrene-acrylate copolymer may be allowed to interact with the tar to at least partially reduce the adhesiveness of the tar. In certain embodiments, after the styrene-acrylate copolymer has been allowed to interact with the tar, the tar then may be removed from the well bore by any means practicable for the given application.

Example Crude-Oil-Treatment Methods

In some embodiments, the treatment fluids may be used for the treatment of crude oil in a well bore. It should be understood that the terms "crude oil" and "liquid crude" may be used interchangeably. Crude oil is generally a naturally occurring liquid that can contain various quantities of paraffins, napthenenes, aromatics, and/or asphaltenes. The crude oil should be differentiated from the preceding tar, as the crude oil has an API gravity greater of about 10 or greater while the tar has an API specific gravity of less than 10. In some instances, natural gas may be dissolved in the crude oil. Crude oil may be produced from well bores drilled into the Earth's surface. When encountered in the well bore by treatments fluids such as drilling fluids, the crude oil can emulsify into the fluid undesirably effecting fluid properties and causing problems with fluid disposal.

In accordance with present embodiments, crude oil encountered in a well bore may be treated with a styrene-acrylate copolymer. One of the many advantages of the present invention, many of which are not discussed or alluded to herein, is that the crude oil treated by the compositions and methods disclosed herein may not emulsify in the treatment fluids. Rather, the crude oil may agglomerate to form a tar-like substance that is substantially less tacky than tar. As a result, crude oil treated in this manner may be susceptible to screen separation from treatment fluids, drill cuttings, tar sands, and the like.

Generally, the methods of the present invention comprise allowing a fluid comprising a styrene-acrylate copolymer to interact with crude oil in a well bore, which may, among other things, cause the crude oil to agglomerate to facilitate removal of the crude oil from the fluid and present emulsification. When the styrene-acrylate copolymer interacts with crude oil, the styrene may cause the crude oil to agglomerate to form a tar-like substance. Because the styrene-acrylate copolymer should coat or encapsulate the crude oil this agglomerated substance is less tacky than tar. In applications where it is desirable to drill through crude oil encountered in the course of drilling a well bore, drilling through crude oil altered in this way may yield agglomerates of the crude oil that can be removed more effectively from the drilling fluid. Additionally, crude oil that is drilled-through may be less likely to flow into the well bore or the subterranean formation as the plastic properties of the crude oil may be altered. Similarly, in applications where the styrene-acrylate copolymer is added to a drilling fluid, the treated crude oil that forms about the surface of the well bore may act to stabilize the well bore. In addition, crude oil treated with the compositions and methods of the present invention may be separated from a treatment fluid by passing the fluid through a screen or similarly separation apparatus.

In one embodiment, the present invention provides a method comprising contacting crude oil in a well bore with a treatment fluid comprising an aqueous fluid and a styrene-acrylate copolymer. In such embodiments, the styrene-acrylate copolymer may be provided in various forms, including, but not limited to, an emulsion, a suspension, a powder, and any combination thereof. In certain embodiments, the treatment fluid may be an aqueous-based fluid. Introducing the styrene-acrylate copolymer to the vicinity of a desired portion of the well bore may be accomplished by a variety of methods known by a person of ordinary skill in the art with the benefit of this disclosure. One example of such a method comprises pumping water into the well bore, wherein the styrene-acrylate copolymer is carried into the well bore on the leading edge of the water (e.g., a plug). In other embodiments of the present invention, the polymer may be pumped into the well bore while suspended in a treatment fluid (e.g., a drilling fluid).

In certain embodiments, the styrene-acrylate copolymer may be provided as a "spot treatment" or "pill," wherein the polymer is pumped into the well bore to interact with crude oil in a specific portion of the well bore. In certain embodiments of this type, the styrene-acrylate copolymer may be allowed to interact with the crude oil in the well bore for at least a time sufficient to at least partially reduce the adhesiveness of the crude oil. In some circumstances, this may be more than about one hour. In others, more time will be required for treatment of the crude oil to reduce its tendency to emulsify in aqueous-based fluids, depending upon, among other factors, the temperature inside the well bore and the amount of crude oil in the portion of the well bore being treated. One of ordinary skill in the art, with the benefit of this disclosure, will be able to determine the appropriate amount of time to allow the styrene-acrylate copolymer to interact with the crude oil. In certain embodiments, after the styrene-acrylate copolymer has been allowed to interact with the crude oil, the crude oil then may be removed from the well bore by any means practicable for the given application.

In some applications, embodiments of the present invention may be used in conjunction with non-aqueous treatment fluids. Embodiments such as a spot treatment or pill may be especially suited for use in conjunction with non-aqueous-based treatment fluids, wherein the pill containing the styrene-acrylate copolymer may be used ahead of and/or behind a non-aqueous drilling fluid, which may comprise any number or organic liquids, including, but are not limited to, mineral oils, synthetic oils, esters, paraffin oils, diesel oil, and the like.

In another embodiment, the present invention provides a method comprising contracting crude oil in a well bore with a treatment fluid comprising an aqueous fluid and a styrene-acrylate copolymer into a well bore and allowing the styrene-acrylate copolymer to interact with crude oil in the well bore to cause the crude oil to agglomerate. In certain embodiments of this type, the styrene-acrylate copolymer may be allowed to interact with the crude oil as long as the treatment fluid is present in the well bore. One of ordinary skill in the art, with the benefit of this disclosure, will be able to determine the appropriate amount of time to allow the styrene-acrylate copolymer to interact with the crude oil so as to at least partially reduce the tendency of the crude oil to emulsify. In certain embodiments, after the styrene-acrylate copolymer has been allowed to interact with the crude oil, the crude oil then may be removed from the well bore by any means practicable for the given application.

In another embodiment, the present invention provides a method comprising: placing a treatment fluid comprising an aqueous fluid and a styrene-acrylate copolymer into a well bore; and monitoring the amount of the styrene-acrylate copolymer present in the treatment fluid. For example, once a unit of styrene-acrylate copolymer in a treatment fluid is allowed to interact with a unit of crude oil in a well bore, that unit of styrene-acrylate copolymer may be depleted from the treatment fluid and thus unable to interact with additional crude oil. For this reason, it may be desirable to monitor the concentration of the styrene-acrylate copolymer in the treatment fluid to determine if more should be added. In some embodiments, the styrene-acrylate copolymer may be introduced into the treatment fluid before the treatment fluid is introduced into the well bore, for example, a batch-mixing process. In some embodiments, it may be desirable to continue to ad the styrene-acrylate copolymer to the treatment fluid (e.g., "on-the-fly" mixing) according to the monitored concentration of the styrene-acrylate copolymer in the treatment fluid. In some embodiments, the concentration of styrene-acrylate copolymer in the treatment fluid may be monitored by direct measurement. In some embodiments, the concentration of styrene-acrylate copolymer in the treatment fluid may be monitored indirectly by measuring the depletion of the styrene-acrylate copolymer from the treatment fluid. The concentration of the styrene-acrylate copolymer in the treatment fluid may be monitored, for example, by analytical polymer spectroscopy, chromatography, gravimetry, and quantitative precipitation.

Another embodiment provides a method of drilling a well bore comprising: using a drill but to enlarge a well bore; and circulating a drilling fluid past the drill but to remove cuttings there from, the drilling fluid comprising an aqueous fluid and a styrene-acrylate copolymer. In some embodiments, the drilling fluid may be an aqueous-based drilling fluid. In certain embodiments, crude oil may be present within the well bore, and the styrene-acrylate copolymer may be allowed to interact with the crude oil such that the such that the crude oil to agglomerates in the drilling fluid. In certain embodiments, after the styrene-acrylate copolymer has been allowed to interact with the crude oil, the crude oil then may be removed from the well bore by any means practicable for the given application. For example, the drilling fluid may be removed from the well bore and screened to remove the crude oil from the drilling fluid.

To facilitate a better understanding of the present invention, the following examples of specific embodiments are given. In no way should the following examples be read to limit or define the entire scope of the invention.

Example 1

Certain embodiments of the present invention were tested in an aqueous-base fluid formulated as shown in Table 1.

TABLE 1

| Base Fluid 1 | |
| --- | --- |
| Fresh Water (lb/bbl) | 345.8 |
| Xanthan Gum (lb/bbl) | 0.701 |
| Starch (lb/bbl) | 4.206 |
| Cellulose (lb/bbl) | 0.701 |
| Caustic Soda (lb/bbl) | 0.05 |

A non-aqueous-base fluid was also formulated as shown in Table 2.

TABLE 2

| Base Fluid 2 | |
| --- | --- |
| Synthetic Base Oil (lb/bbl) | 131.45 |
| Fatty Acid Emulsifier (lb/bbl) | 10 |
| Freshwater (lb/bbl) | 84.12 |
| Lime (lb/bbl) | 1 |
| Polymeric Filtration Agent (lb/bbl) | 2 |
| Barium Sulfate (lb/bbl) | 188.96 |
| Calcium Carbonate (lb/bbl) | 15 |
| Calcium Chloride (lb/bbl) | 29.09 |
| Simulated Drill Solids (lb/bbl) | 20 |
| Rheology Modifier (lb/bbl) | 1 |

A 50 g sample of tar sand (25% tar by mass) was placed in a first ½ lab barrel along with 133.1 g of Base Fluid 1 and a steel test rod. A 12.5 g sample of tar was placed in a second ½ lab barrel along with 216.9 g of Base Fluid 2 and a steel test rod. The barrels were then hot rolled for 16 hours at 150° F. (approx. 66.7° C.) under 200 psi in a rolling cell, and the test rods were visually inspected for tar accretion. Base Fluid 1 was contaminated with tar sand, and tar was accreted on the test rod. Base Fluid 2 was contaminated with tar, and tar was accreted on the test rod.

Example 2

The two fluid samples were prepared as set forth in Table 3 using the Base Fluid 1 described in Table 1. The fluid samples are designate Sample A and Sample B in the table below. The styrene-acrylate copolymers used in this example were obtained as an emulsion and used as received. Baracor 700™ corrosion inhibitor is an anti-corrosion additive commercially available form Halliburton Energy Services, Houston, Tex. After hot rolling for 16 hours at 150° F. (approx. 66.7° C.) under 200 psi in a rolling cell, the mass of the test rod was determined both with any accreted tar and after the accreted tar had been cleaned off. These masses and the mass of the accreted tar for each sample is reported in Table 3.

TABLE 3

| Sample | A | B |
| --- | --- | --- |
| Base Fluid 1(g) | 133.1 | 150.6 |
| Styrene-Acrylate Emulsion(g) | 15 | 15 |
| Baracor 700 ™ Corrosion Inhibitor (ml) | 0.75 | 0.75 |
| Tar Sand (g) | 50 | — |
| Tar (g) | — | 12.5 |
| Post Accretion Test Rod Mass (g) | 337.45 | 337.16 |
| Post Cleaning Test Rod Mass (g) | 337.25 | 336.93 |
| Mass of accreted tar (g) | 0.20 | 0.23 |
| Observations | Tar not sticking to cell wall. Rod is clean. Tar is firm, not sticky. Sand is separated from tar and settled on bottom of cell. Fluid not contaminated. | Tar form small flocs. Tar not on cell wall. Rod has loosely adhered flocs that can be easily brushed away. Tar is pliable but not sticky. |

Example 3

In this example, tar was screened from tar-containing fluids. Base fluid 1 was combined with tar sand and, in two cases, a treatment additive, as illustrated in Table 4 below. The tar-containing fluids were hot rolled then poured across a vibrating screen material to assess potential screen clogging properties. A screen may be considered fouled if the tar is adhesive and begins to seal/clog the screen openings thereby preventing a fluid from effectively draining. Sample C was a baseline reference of nontreated, adhesive tar and yielded adhesive screen fouling. Sample D was an unsuccessful treatment with a sodium salt that also yielded adhesive screen fouling. Sample E was a chemical treatment of tar with styrene-acrylate copolymers that yielded a non-adhesive tar and minimized screen fouling. The styrene-acrylate copolymers used in this example (E) were the same as in the previous tests.

TABLE 4

| Sample | D | E | F |
|---|---|---|---|
| Base Fluid 1(g) | 149.8 | 149.8 | 149.8 |
| Sodium Salt (g) | — | 26.25 | — |
| Styrene acrylate emulsion(g) | — | — | 15 |
| Baracor 700 ™ Corrosion Inhibitor (ml) | — | — | 0.75 |
| Tar Sand (g) | 50 | 50 | 50 |

Example 4

Certain embodiments of the present invention were tested in an aqueous-base fluid formulated as shown in Table 5.

TABLE 5

| Base Fluid 3 | |
|---|---|
| Fresh Water (bbl/bbl) | 0.976 |
| Xanthan Gum (lb/bbl) | 0.5 |
| Starch (lb/bbl) | 2.5 |
| Caustic Soda (lb/bbl) | 0.035 |
| Filtration Control Agent (lb/bbl) | 1.0 |
| Shale Stabilizer (lb/bbl) | 0.5 |
| Corrosion Inhibitor (lb/bbl) | 6 |

The xanthan gum used was BARAZAN® D PLUS viscosifier, available from Halliburton Energy Services. Inc. The starch used was FILTER-CHECK™ filtration control agent, available from Halliburton Energy, Inc. The filteration control agent used was PAC™-R filtration control agent available from Halliburton Energy Services, Inc. The shale stabilizer used was EZ-MUD® polymer emulsion available from Bariod Industrial Drilling Products. The corrosion inhibitor used was Baracor 700™ corrosion inhibitor available from Halliburton Energy Services, Inc.

Using Base Fluid 3, three fluid samples were prepared and tested for treatment of crude oil as set forth in Table 6. The fluid samples are designated Sample G, Sample H, and Sample I in the table below. Sample I did not include the corrosion inhibitor. The styrene-acrylate copolymer used in this example was obtained as latex emulsion (approx. 45 wt % active) and used as received. For each test, the crude oil was placed in a lab barrel together with the respective fluid and a steel rod (to mimic drill-string interaction). The system was then aged by hot rolling for 16 hours at 200° F. (approx. 93.3° C.) under 200 psi of pressure in a rolling cell. The fluid was then allowed cool for 30 minutes and analyzed for emulsification of the crude oil into the fluid as well as properties of the crude oil after treatment. A retort analysis was then performed on the fluid to determine the volume percent of crude oil, water, and solids in the fluid, thus giving an indication of the amount of crude oil emulsified into the fluid. The retort analysis was performed by pulling the sample from below the flowing crude to analyze the amount of crude oil that may have been emulsified into the fluid.

TABLE 6

| Sample | G | H | I |
|---|---|---|---|
| Base Fluid 3 (ml) | 120 | 120 | 120 |
| Crude Oil, lb/bbl | 25 | 25 | 25 |
| Styrene-Acrylate Copolymer Emulsion(lb/bbl) | 30 | 10 | 0 |
| Hot Roll at 200° F. (hr) | 16 | 16 | 16 |
| Observations | Very little crude oil was stuck to the bar. The crude oil was found as a tar-like substance floating on the surface of the fluid. The fluid was not contaminated and looked very clean. | Some crude oil was stuck to the bar. The crude oil was very runny and sticky. The crude oil was found as a tar-like substance floating on the surface of the fluid as a sticky layer. The fluid was slightly more contaminated, but not badly contaminated. | Some crude oil was stuck to the bar. The crude oil was very runny and sticky. The crude oil was found as a tar-like substance floating on the surface of the fluid as a sticky layer. The fluid was heavily contaminated. |
| Retort Analysis (oil %:water %:solid %) | 0%:99%:1% | 0%:99%:1% | 4.5%:95%:0.5% |

As set forth in the table above, the crude oil treated with the styrene-acrylate copolymer (Samples G and H) did not emulsify into the fluid, but rather was found floating on the fluid's surface. However, the crude oil at least partially emulsified into the control (Sample I) without the styrene-acrylate copolymer.

Example 5

Certain embodiments of the present invention were tested in an aqueous-base fluid formulated as shown in Table 7.

TABLE 7

| | Base Fluid 4 | |
|---|---|---|
| | Base (lb/bbl) | Base (kg/m³) |
| Fresh Water (bbl/bbl) | 0.976 | — |
| Xanthan Gum | 0.877 | 2.5 |
| Starch | 5.261 | 15 |
| Caustic Soda | 0.035 | 0.1 |
| Bridging Agent | 8.768 | 25 |
| Simulated Drill Solids | 1.754 | 5 |
| Corrosion Inhibitor (lb/bbl) | 6 | |

The xanthan gum used was BARAZAN® D PLUS viscosifier, available from Halliburton Energy Services. Inc. The starch used was DEXTRID® LT filtration control agent, available from Halliburton Energy, Inc. The bridging agent used was BARCARB® 25 bridging agent, available from Halliburton Energy Services. Inc. The simulated drill solids used were REV DUST® solids, available from Milwhite, Inc. The corrosion inhibitor used was Barcor 700™ corrosion inhibitor available from Halliburton Energy Services, Inc.

Using Base Fluid 4, three fluid samples were prepared and tested for treatment of crude oil as set forth in Table 8. The fluid samples are designated Sample J, Sample K, and Sample L in the table below. Sample L did not include the corrosion inhibitor. The styrene-acrylate copolymer used in this example was obtained as latex emulsion (approx. 45 wt % active) and used as received. For each test, the crude oil was placed in a lab barrel together with the respective fluid and a steel rod (to mimic drill-string interaction). The system was then aged by hot rolling for 16 hours at 200° F. (approx. 93.3° C.) under 200 psi of pressure in a rolling cell. The fluid was then allowed cool for 30 minutes and analyzed for emulsification of the crude oil into the fluid as well as properties of the crude oil after treatment. A retort analysis was then performed on the fluid to determine the volume percent of crude oil, water, and solids in the fluid, thus giving an indication of the amount of crude oil emulsified into the fluid. The retort analysis was performed by pulling the sample from below the flowing crude to analyze the amount of crude oil that may have been emulsified into the fluid.

TABLE 8

| Sample | J | K | L |
|---|---|---|---|
| Base Fluid 4 (ml) | 120 | 120 | 120 |
| Crude Oil, lb/bbl | 25 | 25 | 25 |
| Styrene-Acrylate Copolymer Emulsion(lb/bbl) | 30 | 10 | 0 |
| Hot Roll at 200° F. (hr) | 16 | 16 | 16 |
| Observations | No crude oil was stuck to the bar. The crude oil was found as a tar-like substance floating on the surface of the fluid. The fluid was not contaminated and looked very clean. | Some crude oil was stuck to the bar. The crude oil was very runny and sticky. The crude oil was found as a tar-like substance floating on the surface of the fluid as a sticky layer. The fluid was slightly more contaminated, but not badly contaminated. | Some crude oil was stuck to the bar. The crude oil was very runny and sticky. The crude oil was found as a tar-like substance floating on the surface of the fluid as a sticky layer. The fluid was heavily contaminated. |
| Retort Analysis (oil %:water %:solid %) | 0%:98%:2% | 0%:98%:2% | 1%:96%:3% |

As set forth in the table above, the crude oil treated with the styrene-acrylate copolymer (Samples J and K) did not emulsify into the fluid but was rather floating on the fluid's surface. However, the crude oil at least partially emulsified into the control (Sample L) without the styrene-acrylate copolymer.

For the sake of brevity, only certain ranges are explicitly disclosed herein. However, ranges from any lower limit may be combined with an upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of preventing emulsification of crude oil into an aqueous-based treatment fluid, comprising:
    contacting crude oil in a well bore with the aqueous-based treatment fluid comprising a styrene-acrylate copolymer, wherein the aqueous-based treatment fluid has a density of about 12 pounds per gallon to about 18 pounds per gallon, wherein the crude oil has an API gravity of about 10 or greater; and
    allowing the styrene-acrylate copolymer to interact with the crude oil in the well bore; wherein the crude oil is not emulsified.

2. The method of claim 1, the method further comprising screening the crude oil from the aqueous-based treatment fluid.

3. The method of claim 1 further comprising monitoring the amount of the styrene-acrylate copolymer present in the aqueous-based treatment fluid; and adding additional styrene-acrylate copolymer to the aqueous-based treatment fluid in response to the step of monitoring.

4. The method of claim 1 wherein the aqueous-based treatment fluid is placed in the well bore to interact with crude oil present at a specific location therein.

5. The method of claim 1 wherein the aqueous-based treatment fluid is placed into the well bore during drilling of the well bore.

6. The method of claim 1 wherein the styrene-acrylate copolymer comprises:
at least one unit selected from the group consisting of a styrene, a substituted styrene, and any derivative thereof; and
at least one unit selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, and any derivative thereof.

7. The method of claim 1 wherein the styrene-acrylate copolymer comprises a styrene-methacrylate copolymer.

8. The method of claim 1 wherein the styrene-acrylate copolymer comprises a crosslinked styrene-acrylate copolymer emulsion.

9. The method of claim 1 wherein the styrene-acrylate copolymer is derived from monomers consisting of one or more styrene monomers and one or more acrylate monomers.

10. The method of claim 1 wherein the styrene-acrylate copolymer is present in an amount of about 1% to about 10% by volume of the aqueous-based treatment fluid.

11. The method of claim 1 wherein the aqueous-based treatment fluid further comprises a surfactant.

12. A method of treating crude oil, comprising:
using a drill bit to enlarge a well bore in a subterranean formation, wherein crude oil from the subterranean formation enters the well bore, wherein the crude oil has an API gravity of about 10 or greater; and
circulating an aqueous-based drilling fluid past the drill bit, the aqueous-based drilling fluid comprising an aqueous fluid and a styrene-acrylate copolymer, wherein the aqueous-based drilling fluid has a density of about 12 pounds per gallon to about 18 pounds per gallon, wherein the styrene-acrylate copolymer interacts with the crude oil in the well bore such that the crude oil forms agglomerates in the aqueous-based drilling fluid, and wherein the crude oil is not emulsified.

13. The method of claim 12 further comprising screening the agglomerates of crude oil from the aqueous-based drilling fluid.

14. The method of claim 12 wherein the styrene-acrylate copolymer comprises:
at least one unit selected from the group consisting of a styrene, a substituted styrene, and any derivative thereof; and
at least one unit selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, and any derivative thereof.

15. The method of claim 12 wherein the styrene-acrylate copolymer comprises a styrene-methacrylate copolymer.

16. The method of claim 12 wherein the styrene-acrylate copolymer is derived from monomers consisting of one or more styrene monomers and one or more acrylate monomers.

17. The method of claim 12 wherein the styrene-acrylate copolymer is present in an amount of about 1% to about 10% by volume of the aqueous-based drilling fluid.

18. A method of treating crude oil, comprising:
using a drill bit to enlarge a well bore in a subterranean formation, wherein crude oil from the subterranean formation enters the well bore, wherein the crude oil has an API gravity of about 10 or greater;
circulating an aqueous-based drilling fluid past the drill bit, wherein the aqueous-based drilling fluid comprises an aqueous fluid and a crosslinked styrene-methacrylate copolymer emulsion in an amount sufficient to prevent emulsification of the crude oil into the aqueous-based drilling fluid, wherein the aqueous-based treatment fluid has a density of about 12 pounds per gallon to about 18 pounds per gallon; and
screening the aqueous-based drilling fluid such that the crude oil is removed from the aqueous-based drilling fluid.

19. The method of claim 18 wherein the crosslinked styrene-methacrylate copolymer emulsion is derived from monomers consisting of one or more styrene monomers and one or more methacrylate monomers.

20. The method of claim 18 wherein the crosslinked styrene-methacrylate copolymer emulsion is present in an amount of about 1% to about 10% by volume of the aqueous-based drilling fluid.

* * * * *